Nov. 27, 1956  R. T. CORNELIUS  2,772,118
SPRAYING DEVICES
Filed Aug. 14, 1953
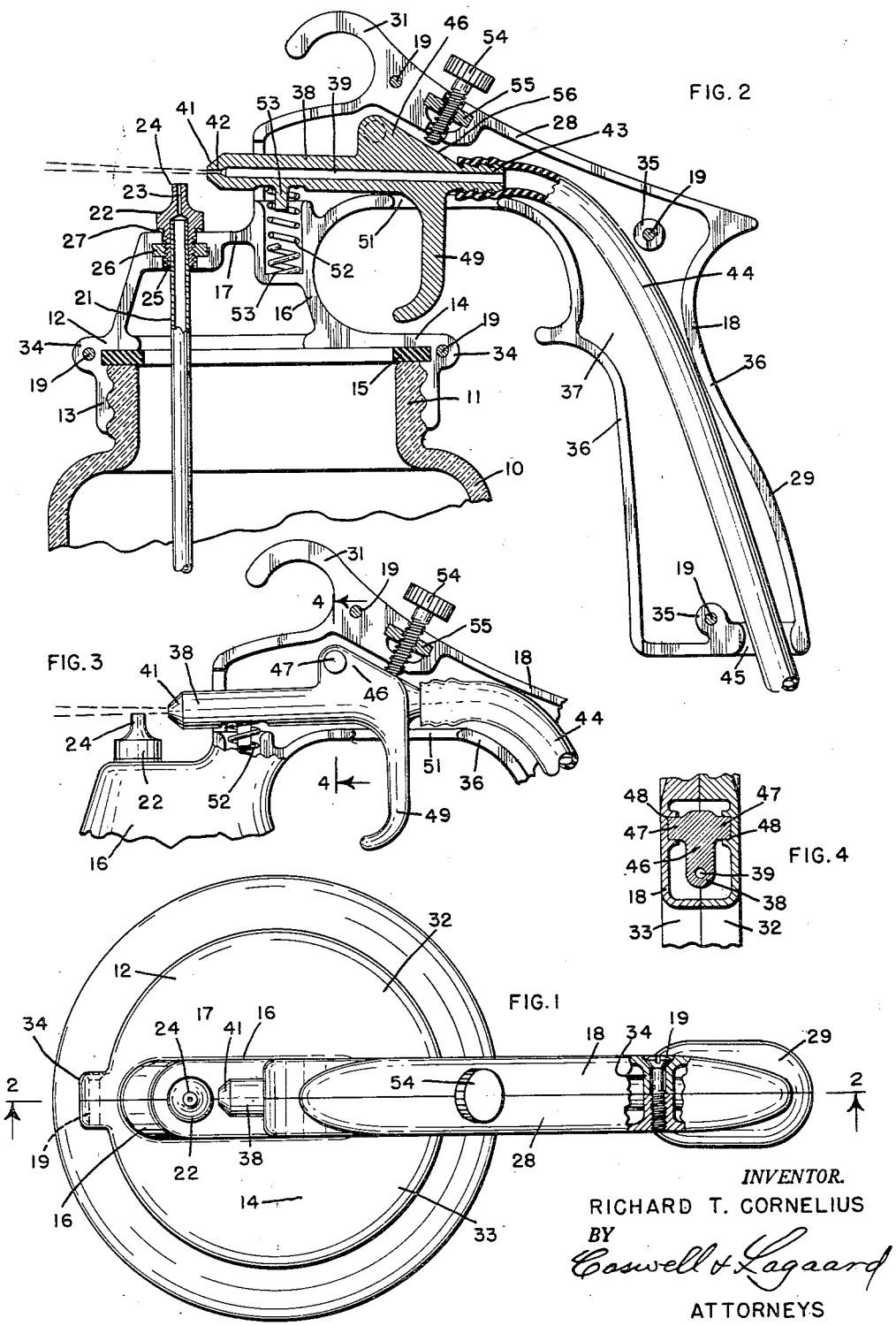
INVENTOR.
RICHARD T. CORNELIUS
BY
Coswell & Lagaard
ATTORNEYS United States Patent Office 2,772,118
Patented Nov. 27, 1956

2,772,118

SPRAYING DEVICES

Richard T. Cornelius, Minneapolis, Minn.

Application August 14, 1953, Serial No. 374,313

2 Claims. (Cl. 299—88)

The herein disclosed invention relates to spraying devices and has for an object to provide a spraying device in which the spray can be easily and quickly turned on and off.

Another object of the invention resides in providing a device in which valves are entirely eliminated.

An object of the invention resides in providing a receptacle for the liquid to be sprayed, open at the top, and having a cap and in further providing a vertically extending tube in said cap extending into said liquid and terminating outwardly of the cap in a liquid nozzle having a vertical passageway.

Another object of the invention resides in providing an air nozzle having a horizontal passageway and in pivotally mounting the air nozzle on a part carried by the cap for swinging movement from a position directing a stream of air over the upper end of the liquid nozzle and to a position away from the same.

A feature of the invention resides in constructing the cap with a raised top and in providing a handle extending outwardly from said top.

An object of the invention resides in pivoting the air nozzle to said handle and in connecting a flexible tube to the air nozzle and which may be connected to a source of air under pressure.

A further object of the invention resides in providing a finger piece on the air nozzle operable while holding the handle to swing the air nozzle into operative position and in further providing resilient means for normally urging the air nozzle into inoperative position.

Other objects of the invention reside in the novel combination and arrangement of parts and in the details of construction hereinafter illustrated and/or described.

In the drawings:

Fig. 1 is a plan view of a spraying device illustrating an embodiment of the invention.

Fig. 2 is a vertical sectional view taken on line 2—2 of Fig. 1.

Fig. 3 is a fragmentary view of a portion of the structure shown in Fig. 2 and illustrating the air nozzle in operative position.

Fig. 4 is a cross sectional view taken on line 4—4 of Fig. 3.

The construction shown in the drawings consists of a receptacle for the liquid to be sprayed open at the top and closed by means of a cap having a raised top. Extending through this top is a vertically positioned tube extending into the liquid and terminating in a liquid nozzle disposed exteriorly of the cap and having a vertically positioned passageway. Extending outwardly from the raised top is a hollow handle receiving an air nozzle having a substantially horizontal air discharge passageway and positioned in proximity to the liquid nozzle. Trunnions formed on the air nozzle and pivoted in sockets in the handle guide the air nozzle for swinging movement from a position directing air immediately over the end of the liquid nozzle into a position remote therefrom. A flexible tube is connected to the air nozzle and extends through said handle where the same may be attached to a suitable source of air under pressure. A finger piece formed on said air nozzle is disposed between the cap and the handle and is readily accessible when the handle is grasped to move the nozzle into operative position. A spring acting on the nozzle shifts the nozzle into inoperative position.

For the purpose of illustrating the invention a receptacle 10 has been shown which is adapted to contain the liquid to be sprayed. This receptacle is open at the upper portion of the same and is formed with a threaded neck 11 encircling the open end of said receptacle. A cap 12 closes the open end of the receptacle 10 and is formed with a threaded skirt 13 adapted to screw on the neck 11. The cap 12 has a flange 14 overlying the neck 11 and between which and said neck is mounted a gasket 15 forming a tight seal between the cap and receptacle. The flange 14 has issuing upwardly from it a raised wall structure 16 which terminates in a raised top 17 for the cap. Issuing outwardly from the wall structure 16 and the top 17 is a handle 18 and by means of which the spraying device may be conveniently handled.

Extending through the top 17 is a liquid discharge tube 21 which extends downwardly in the receptacle 10 to within a short distance of the bottom thereof. This tube has secured to the outer end of the same a nozzle 22 having a vertically extending discharge passageway 23 projecting through the tip 24 thereof. The nozzle 22 is formed with a threaded shank 25 which is screwed into a nut 26 imbedded in the top 13. A gasket 27 forms a fluid-tight connection between said nozzle and cap.

The handle 18 consists of a horizontal portion 28 and a hand grip 29 depending therefrom. The portion 28 issues from the raised wall structure 16 of cap 13 and the top 17 and the same is spaced from the flange 14 as best shown in Fig. 2. At the uppermost part of the portion 28 is formed a hook 31 by means of which the sprayer may be hooked on a nail or other supporting structure when desired. The cap 12 and handle 18 are preferably constructed as die-castings and are formed in two halves 32 and 33 which are secured together by means of screws 19 extending through lugs 34 on the cap 13 and bosses 35 in the handle 18 of the half 32 of said castings and which are screwed into the half 33. By means of this construction, the handle 18 is formed with a wall structure 36 providing a hollow space 37 within the handle.

Within the upper portion of the space 37 in the portion 28 of handle 18 is disposed an air nozzle 38. This air nozzle has a bore 39 extending through it and which communicates at the tip 41 of said nozzle with a horizontally disposed discharge passageway 42. The other end of the nozzle 38 is provided with a tube fitting 43 which has attached to it a flexible tube 44 adapted to be connected to a suitable source of air under pressure. This tube extends through an opening 45 in the lowermost portion of the wall structure 36 of handle 18. The nozzle 38 is constructed with an upper extension 46 which has formed on it two trunnions 47. These trunnions are rotatably mounted in sockets 48, best shown in Fig. 4, formed in the halves 32 and 33 and rotatably support the air nozzle 38 for swinging movement. The nozzle 38 is so positioned that it may swing from a position such as shown in Fig. 3 in which the air discharged through passageway 42 flows directly over the outlet of the discharge passageway 23 of nozzle 22. The said nozzle may also swing from such position to a position shown in Fig. 2 in which the air stream is remote from the discharge end of the nozzle 22.

For manipulating the air nozzle 38, a finger piece 49 in the form of a trigger is formed on the air nozzle 38 which extends downwardly therefrom and through an opening 51 in the wall structure 36 of the portion 28 of handle 18. This finger piece is readily manipulated by the operator when the handle 18 is grasped. A compression coil spring 52 engages a spring seat 53 formed in the top 17 of cap 12 and also encircles a lug 53 formed on the under side of nozzle 38 and engages said nozzle on the under side and urges the same upwardly. By means of this construction the nozzle is normally urged into inoperative position and may be urged into operative position against the action of the spring 52 by manipulation of the finger piece 49. To determine the operative position of the nozzle 38, an adjusting screw 54 is employed which is screwed into a nut 55 imbedded in the portion 28 of handle 18. This screw engages a surface 56 on the extension 46 of nozzle 38 and limits the movement of said nozzle caused by engagement of the finger piece 49.

In operation the liquid to be sprayed is inserted in the receptacle 10, the cap 12 applied, and tube 44 connected to a source of air under pressure. The air flows constantly through the bore 39 and passageway 42, and due to the position of the nozzle 38 caused by spring 52 is discharged above the nozzle 22 and has no effect on the liquid within the receptacle. When the handle 18 is grasped and the finger piece 49 drawn toward the said handle the nozzle 38 is lowered and the air stream passes over the top of the tip 24 of nozzle 22. This creates a suction in the passageway 23 of said nozzle and draws the liquid from the receptacle 10 up through the tube 21 and discharges it from said tube in the form of a spray. As soon as the finger piece is released, the spraying device is immediately rendered inoperative and spraying ceases.

The advantages of the invention are manifest. With the invention disclosed, no valves of any kind are required. The device is not readily apt to get out of order and will function indefinitely without attention other than cleaning of the nozzle through which the liquid being sprayed passes. The spraying device can be constructed at a nominal expense and can be readily taken apart for inspection and repair.

Changes in the specific form of the invention, as herein described, may be made within the scope of what is claimed without departing from the spirit of the invention.

Having described the invention, what is claimed as new and desired to be protected by Letters Patent is:

1. In a spraying device, a receptacle open at the top for liquid to be sprayed, a cap for closing said receptacle, a tube extending through said cap and into the liquid, a liquid nozzle at the end of said tube and having an upwardly extending discharge passageway, a raised top on said cap, a hollow handle issuing outwardly from said top and fixed relative thereto, an air nozzle disposed within said handle, a flexible tube for connection to a source of air under pressure connected to said nozzle and extending through said handle, said air nozzle being disposed to one side of said liquid nozzle and having a discharge passageway transverse to the passageway in said liquid nozzle, pivot means acting between said handle and air nozzle and guiding said air nozzle for swinging movement from an operative position at said nozzle and at which the air stream therefrom traverses the open end of the liquid nozzle and to an inoperative position away from said liquid nozzle, said tube flexing to accommodate such movement, a spring acting between said nozzle and the top of said cap and urging the air nozzle into inoperative position and a finger piece on said nozzle disposed above said cap and rearwardly of the raised top thereof and engageable for moving the air nozzle into operative position when the handle is grasped.

2. In a spraying device, a receptacle open at the top for liquid to be sprayed, a cap having a flange overlying the open end of said receptacle and a raised wall structure at the forward portion of the cap, a raised top on said wall structure, a tube extending through the raised top and into the liquid, a liquid nozzle at the end of said tube and having an upwardly extending discharge passageway, a hollow handle integral with said top and having a horizontal portion issuing rearwardly from the top, and disposed above said flange to provide a space therebetween situated rearwardly of the raised wall structure, said handle further having a hollow depending hand grip extending along the wall structure and receptacle, an air nozzle disposed within the horizontal portion of the handle and projecting forwardly therefrom and adapted to discharge in a horizontal direction, pivot means between said nozzle and the forward portion of the handle, a trigger issuing downwardly from said nozzle and into the aforementioned space, said trigger on being moved rearwardly moving the stream from said second named nozzle from a position remote from said first named nozzle and to a position directed to the top of the same said raised wall structure having a depression in the upper portion of the same and a compression coil spring in said depression engaging said second named nozzle and urging it into inoperative position and a flexible tube connected to said air nozzle and extending through said hand grip.

References Cited in the file of this patent
UNITED STATES PATENTS

| | | |
|---|---|---|
| 1,169,558 | More et al. | Jan. 25, 1916 |
| 1,822,553 | Uphoff | Sept. 8, 1931 |
| 2,030,853 | Budwig | Feb. 18, 1936 |
| 2,240,401 | Jordan | Apr. 29, 1941 |